United States Patent
Woo et al.

(10) Patent No.: US 9,570,009 B2
(45) Date of Patent: Feb. 14, 2017

(54) PIXEL CIRCUIT OF DISPLAY DEVICE, ORGANIC LIGHT EMITTING DISPLAY DEVICE AND METHOD FOR DRIVING THE SAME

(71) Applicant: LG DISPLAY CO., LTD., Seoul (KR)

(72) Inventors: Dong Kyun Woo, Paju-si (KR); Gi-Hong Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 88 days.

(21) Appl. No.: 14/559,694

(22) Filed: Dec. 3, 2014

(65) Prior Publication Data
US 2015/0161940 A1  Jun. 11, 2015

(30) Foreign Application Priority Data
Dec. 11, 2013 (KR) .................. 10-2013-0154021

(51) Int. Cl.
*G09G 3/325* (2016.01)
*G09G 3/32* (2016.01)
*G09G 3/00* (2006.01)
*H04N 13/04* (2006.01)

(52) U.S. Cl.
CPC .............. *G09G 3/325* (2013.01); *G09G 3/003* (2013.01); *G09G 3/3241* (2013.01); *G09G 2300/0809* (2013.01); *G09G 2300/0852* (2013.01); *G09G 2300/0861* (2013.01); *G09G 2310/0251* (2013.01); *G09G 2310/0262* (2013.01); *G09G 2320/0214* (2013.01); *H04N 13/04* (2013.01)

(58) Field of Classification Search
None
See application file for complete search history.

(56) References Cited

U.S. PATENT DOCUMENTS

| 8,139,157 | B2* | 3/2012 | Someya | H04N 5/20 348/603 |
| 8,487,843 | B2* | 7/2013 | Goh | G09G 3/3233 315/169.3 |
| 8,531,358 | B2* | 9/2013 | Choi | G09G 3/3233 345/76 |

(Continued)

FOREIGN PATENT DOCUMENTS

| CN | 101430862 A | 5/2009 |
| CN | 102160386 A | 8/2011 |

(Continued)

*Primary Examiner* — Chad Dicke
(74) *Attorney, Agent, or Firm* — Birch, Stewart, Kolasch & Birch, LLP

(57) ABSTRACT

A pixel circuit of a display device, an organic light emitting display device and a method for driving the same are discussed. The pixel circuit of the display device in one example includes an organic light emitting device emitting light through a current; a driving transistor controlling the current flowing in the organic light emitting device; a first capacitor connected between gate and source electrodes of the driving transistor; a second capacitor in which a data voltage is previously stored; and a switching unit charging the data voltage, which is stored in the second capacitor, in the first capacitor, and allowing the organic light emitting device to emit light by driving the driving transistor in accordance with the data voltage charged in the first capacitor and at the same time charging a data voltage of next frame in the second capacitor.

14 Claims, 9 Drawing Sheets

(56) References Cited

U.S. PATENT DOCUMENTS

| | | | | |
|---|---|---|---|---|
| 8,558,767 B2* | 10/2013 | Kwon | | G09G 3/3233 315/169.3 |
| 8,848,041 B2* | 9/2014 | Park | | H04N 13/0438 348/42 |
| 2005/0088378 A1* | 4/2005 | Ozawa | | G09G 3/3233 345/76 |
| 2006/0022305 A1* | 2/2006 | Yamashita | | G09G 3/2014 257/565 |
| 2006/0077194 A1* | 4/2006 | Jeong | | G09G 3/3233 345/204 |
| 2007/0279345 A1* | 12/2007 | Kim | | G09G 3/3233 345/80 |
| 2008/0030495 A1* | 2/2008 | Shirasaki | | G09G 3/3233 345/214 |
| 2008/0036710 A1* | 2/2008 | Kim | | G09G 3/3233 345/82 |
| 2009/0140959 A1* | 6/2009 | Nam | | G09G 3/3233 345/76 |
| 2010/0066820 A1* | 3/2010 | Park | | H04N 13/0438 348/53 |
| 2010/0245402 A1* | 9/2010 | Choi | | G09G 3/3233 345/690 |
| 2011/0025659 A1* | 2/2011 | Kwak | | G09G 3/3233 345/205 |
| 2011/0090213 A1* | 4/2011 | Han | | G09G 3/3233 345/213 |
| 2011/0199357 A1* | 8/2011 | Chung | | G09G 3/3233 345/211 |
| 2012/0019501 A1* | 1/2012 | Choi | | G09G 3/3233 345/211 |
| 2012/0019569 A1* | 1/2012 | Byun | | G09G 3/3233 345/690 |
| 2012/0113168 A1* | 5/2012 | Seo | | G09G 3/003 345/691 |
| 2012/0139901 A1 | 6/2012 | Hwang | | |
| 2012/0299978 A1* | 11/2012 | Chaji | | G09G 3/3291 345/690 |
| 2012/0306843 A1* | 12/2012 | Wang | | G09G 3/3258 345/212 |
| 2013/0088417 A1* | 4/2013 | Kim | | G09G 3/3233 345/82 |
| 2013/0127818 A1* | 5/2013 | Tsai | | G09G 3/14 345/212 |
| 2013/0141316 A1* | 6/2013 | Lee | | G09G 3/3266 345/76 |
| 2013/0335391 A1* | 12/2013 | Kim | | G09G 3/3291 345/211 |
| 2014/0071028 A1* | 3/2014 | Han | | G09G 3/3266 345/77 |
| 2014/0139408 A1* | 5/2014 | Kim | | G09G 3/3233 345/76 |
| 2014/0192037 A1* | 7/2014 | Chung | | G09G 3/2022 345/212 |
| 2014/0313232 A1* | 10/2014 | Han | | G09G 3/3696 345/690 |
| 2014/0340290 A1* | 11/2014 | Ono | | G09G 3/3233 345/77 |
| 2015/0070407 A1* | 3/2015 | Lee | | G09G 3/3233 345/690 |
| 2015/0154914 A1* | 6/2015 | Han | | G09G 3/3291 345/76 |
| 2015/0194092 A1* | 7/2015 | Ma | | G09G 3/3233 345/77 |
| 2015/0206476 A1* | 7/2015 | Qi | | G09G 3/3233 345/76 |
| 2016/0042690 A1* | 2/2016 | Chang | | G09G 3/3258 345/212 |

FOREIGN PATENT DOCUMENTS

| | | |
|---|---|---|
| CN | 102347001 A | 2/2012 |
| CN | 102831871 A | 12/2012 |

* cited by examiner

PIXEL CIRCUIT OF DISPLAY DEVICE, ORGANIC LIGHT EMITTING DISPLAY DEVICE AND METHOD FOR DRIVING THE SAME

CROSS REFERENCE TO RELATED APPLICATIONS

This application claims the priority benefit of the Korean Patent Application No. 10-2013-0154021 filed on Dec. 11, 2013, which is hereby incorporated by reference for all purposes as if fully set forth herein.

BACKGROUND OF THE INVENTION

Field of the Invention

The present invention relates to an organic light emitting display device, and more particularly, to an organic light emitting display device that may improve luminance while preventing picture quality from being deteriorated.

Discussion of the Related Art

A stereoscopic image display device allows a left-eye image and a right-eye image, which have binocular parallax, to be separated from each other and be displayed respectively for a left eye and a right eye of a viewer. In other words, the stereoscopic image display device allows the right-eye image to be perceived by only the right eye of the viewer and allows the left-eye image to be perceived by only the left eye of the viewer, whereby the viewer may view stereoscopic three-dimensional images. This stereoscopic image display device may be classified into a glasses mode and a glassesless mode.

The glasses mode realizes a stereoscopic image through glasses provided with a liquid crystal shutter. Such a liquid crystal shutter mode allows the left eye and the right eye to see their respective images different from each other. In other words, the stereoscopic image display device of the liquid crystal shutter mode alternately drives a left-eye liquid crystal shutter and a right-eye liquid crystal shutter of glasses to synchronize with an alternate display of a left-eye image and a right-eye image, thereby separating the left-eye image transmitting the left-eye liquid crystal shutter from the right-eye image transmitting the right-eye liquid crystal shutter and respectively providing the left-eye image and the right-eye image to the viewer.

Although this stereoscopic image display device of the liquid crystal shutter mode provides a stereoscopic effect by separating the left-eye image from the right-eye image, the stereoscopic image display device has a problem in that picture quality of a stereoscopic image is deteriorated due to crosstalk that allows a viewer to perceive a ghost image of the left-eye image and the right-eye image. In order to solve such a problem, as shown in FIG. 1, black frame insertion technique is used.

The black frame insertion technique inserts black image between every left-eye image L and every right-eye image R as much as sequential scan time periods scan 1 to scan 1080 of the left-eye image L and the right-eye image R and respectively opens a left-eye liquid crystal shutter L_LS and a right-eye liquid crystal shutter R_LS of glasses for three-dimensional image for a display time period of each of the left-eye image L and a display time period of the right-eye image R, whereby crosstalk of the left-eye image L and the right-eye image R is prevented from occurring.

However, the stereoscopic image display device of the liquid crystal shutter mode, to which the black frame insertion technique is applied, has a problem in that luminance is deteriorated due to the black image inserted between every left-eye image L and every right-eye image R.

SUMMARY OF THE INVENTION

Accordingly, the present invention is directed to a pixel circuit of a display device, an organic light emitting display device and a method for driving the same, which substantially obviate one or more problems due to limitations and disadvantages of the related art.

An advantage of the present invention is to provide a pixel circuit of a display device, an organic light emitting display device and a method for driving the same, in which picture quality deterioration caused by crosstalk of left and right-eye images may be avoided and at the same time luminance may be improved.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a pixel circuit of a display device according to an embodiment of the present invention comprises an organic light emitting device emitting light through a current; a driving transistor controlling the current flowing in the organic light emitting device; a first capacitor connected between gate and source electrodes of the driving transistor; a second capacitor in which a data voltage is previously stored; and a switching unit charging the data voltage, which is stored in the second capacitor, in the first capacitor, and allowing the organic light emitting device to emit light by driving the driving transistor in accordance with the data voltage charged in the first capacitor and at the same time charging a data voltage of next frame in the second capacitor.

In another aspect of the present invention, there is provided an organic light emitting display device comprising a display panel including a plurality of pixels having an organic light emitting device emitting light through a current, a driving transistor controlling the current flowing in the organic light emitting device, a first capacitor connected between gate and source electrodes of the driving transistor, a second capacitor in which a data voltage is previously stored, and a switching unit controlling voltages charged in the first and second capacitors; and a panel driver driving each of the plurality of pixels for first to third time periods by controlling the switching unit of each pixel, wherein the switching unit simultaneously resets the first capacitors of the respective pixels for the first time period, charges the data voltage stored in the second capacitor of each pixel in the first capacitor for the second time period, allows the organic light emitting devices of the respective pixels to simultaneously emit light and at the same time charges a data voltage of next frame in the second capacitors of the respective pixels in due order by driving the driving transistor in accordance with the data voltage charged in the first capacitor of each pixel for the third time period.

In other aspect of the present invention, there is provided a method for driving an organic light emitting display device comprising a plurality of pixels including an organic light emitting device emitting light through a current, a driving transistor controlling the current flowing in the organic light emitting device, and a first capacitor connected between gate and source electrodes of the driving transistor, the method comprising the steps of simultaneously resetting the first capacitors of the respective pixels for a first time period; charging a data voltage of a current frame, which is previously stored in a second capacitor of each pixel, in the first capacitor for a second time period; and allowing the organic light emitting devices of the respective pixels to simultaneously emit light and at the same time charging a data voltage of next frame in the second capacitors of the respective pixels in due order by driving the driving transistor in accordance with the data voltage of the current frame, which is charged in the first capacitor of each pixel, for the third time period.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Terminologies disclosed in this specification should be understood as follows.

It is to be understood that the singular expression used in this specification includes the plural expression unless defined differently on the context. The terminologies such as "first" and "second" are intended to identify one element from another element, and it is to be understood that the scope of the present invention should not be limited by these terminologies.

Also, it is to be understood that the terminologies such as "include" and "has" are intended so as not to exclude the presence or optional possibility of one or more features, numbers, steps, operations, elements, parts or their combination. Furthermore, it is to be understood that the terminology "at least one" is intended to include all combinations that may be suggested from one or more related items. For example, "at least one of a first item, a second item and a third item" means combination of all the items that may be suggested from two or more of the first item, the second item and the third item, as well as each of the first item, the second item and the third item.

Hereinafter, the preferred embodiments of a pixel circuit of a display device, an organic light emitting display device and a method for driving the same according to the present invention will be described with reference to the accompanying drawing.

Figure 1:
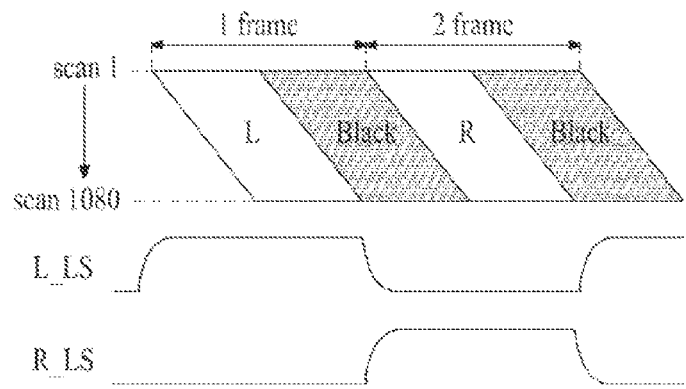
FIG. 1 is a diagram illustrating a method for driving a stereoscopic image display device according to a related art.
Figure 2:
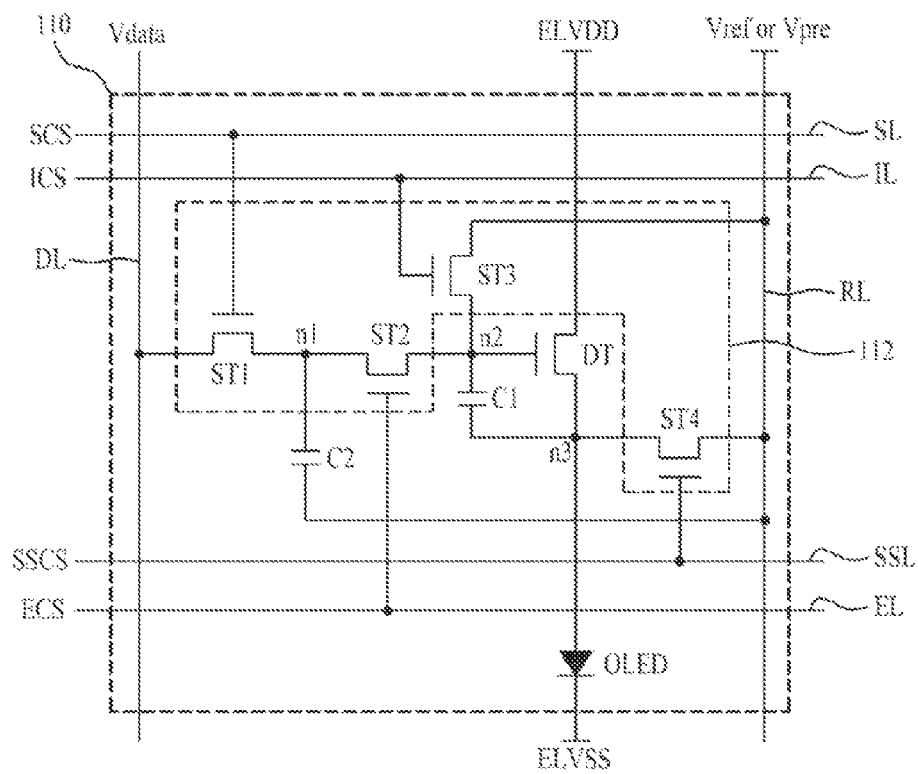
FIG. 2 is a diagram illustrating a pixel circuit of a display device according to an embodiment of the present invention.

FIG. 2 is a diagram illustrating a pixel circuit of a display device according to an embodiment of the present invention.

Referring to FIG. 2, a pixel circuit 110 of the display device according to an embodiment of the present invention is formed in a pixel region defined by a scan control line SL and a data line DL, and includes an organic light emitting device OLED, a driving transistor DT, a first capacitor C1, a second capacitor C2, and a switching unit 112.

The organic light emitting device OLED emits light through a current flowing in accordance with current control of the driving transistor DT. The organic light emitting device OLED includes an organic light emitting layer formed between an anode electrode and a cathode electrode, and emits light of single color such as red, green or blue in accordance with a material and a structure of the organic light emitting layer, or emits white light based on mixture of single colors.

The driving transistor DT is driven by a voltage charged in the first capacitor C1 in accordance with switching of the switching unit 112, thereby controlling the current flowing in the organic light emitting device OLED. The driving transistor DT may include a gate electrode connected to a first electrode of the first capacitor C1, a drain electrode connected to a first driving power line ELVDD, and a source electrode connected to the anode electrode of the organic light emitting device OLED. In this case, the driving transistor DT may be any one of a-Si TFT, poly-Si TFT, Oxide TFT and Organic TFT.

The first capacitor C1 is connected between the gate and source electrodes of the driving transistors DT. The first capacitor C1 serves to drive the driving transistor DT by receiving a voltage Vdata−Vref charged in the second capacitor C2 in accordance with switching of the switching unit 112. To this end, the first electrode of the first capacitor C1 is connected to the gate electrode of the driving transistor DT, and a second electrode of the first capacitor C1 is connected to the source electrode of the driving transistor DT.

The second capacitor C2 serves to store a difference voltage Vdata−Vref of a data voltage Vdata supplied from the data line DL in accordance with switching of the switching unit 112 and a reference voltage Vref supplied to the reference line parallel with the data line DL and transfer the stored voltage Vdata−Vref to the first capacitor C1. To this end, the first electrode of the second capacitor C2 is connected to a first node n1 of the switching unit 112, and the second electrode of the second capacitor C2 is connected to the reference line RL.

The switching unit 112 is connected to the scan control line SL, the data line DL, the reference line RL, a reset control line IL, a sensing control line SSL and a light emitting control line EL, wherein the reset control line IL, the sensing control line SSL and the light emitting control line EL are parallel with the scan control line. The switching unit 112 is switched in accordance with a control signal supplied to the control lines SL, IL, SSL and EL to correspond to first to third time periods, whereby the switching unit 112 resets the voltage of the first capacitor C1 for the first time period, charges the voltage of the second capacitor C2 in the first capacitor C1, and allows the organic light emitting device OLED to emit light in accordance with the voltage of the first capacitor C1 for the third time period, and at the same time charges a data voltage of next frame in the second capacitor C2. In this case, the third time period may be set to a vertical active period of a vertical synchronization signal or a valid data period of a data enable signal. The first and second time periods may be set within a blank period of the vertical synchronization signal which is a reference signal for displaying image in a unit of frame, or may be set within a time period between the last data enable signal of a previous frame and the first data enable signal of a current frame. In the following description, it is assumed that the first and second time periods are set within the blank period.

The switching unit 112 includes first to fourth switching transistors ST1, ST2, ST3 and ST4. In this case, each of the first to fourth switching transistors ST1, ST2, ST3 and ST4 is comprised of the same thin film transistor as the driving transistor DT.

The first switching transistor ST1 is turned on in accordance with a scan control signal SCS supplied to the scan control line SL for the third time period and outputs a data voltage Vdata supplied to the data line DL. To this end, the first switching transistor ST1 includes a gate electrode connected to the scan control line SL, a source electrode connected to the data line DL, and a drain electrode connected to the first node n1.

The second switching transistor ST2 is turned on in accordance with a light emitting control signal ECS supplied to the light emitting control line EL for the second time period and charges the voltage, which is stored in the second capacitor C2, in the first capacitor C1. To this end, the second switching transistor ST2 includes a gate electrode connected to the light emitting control line EL, a drain electrode connected to the first node n1, and a source electrode connected to a second node n2 which is the gate electrode of the driving transistor DT.

The third switching transistor ST3 is turned on in accordance with a reset control signal ICS supplied to the reset control line IL for the first time period and supplies the reference voltage which is a reset voltage to the second node 2. To this end, the third switching transistor ST3 includes a gate electrode connected to the reset control line IL, a drain electrode connected to the reference line RL, and a source electrode connected to the second node n2.

The fourth switching transistor ST4 is turned on in accordance with a sensing control signal SSCS supplied to the sensing control line SSL for the first and second time periods and supplies the reference voltage Vref which is a reset voltage to a third node n3 which is the source electrode of the driving transistor DT. To this end, the fourth switching transistor ST4 includes a gate electrode connected to the sensing control line SSL, a drain electrode connected to the reference line RL, and a source electrode connected to the third node n3.

Figure 3A:
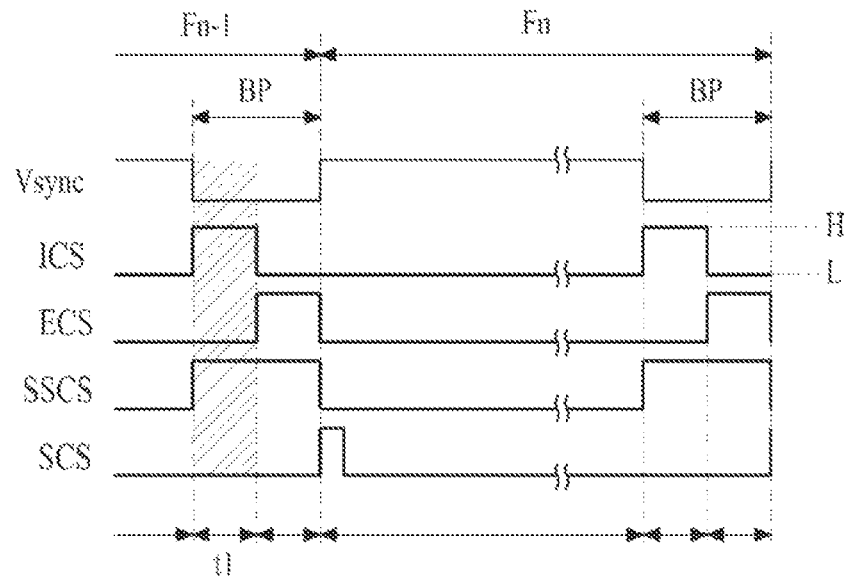
FIGS. 3A to 3C are diagrams illustrating driving of a pixel circuit of a display device according to an embodiment of the present invention.
Figure 3A:
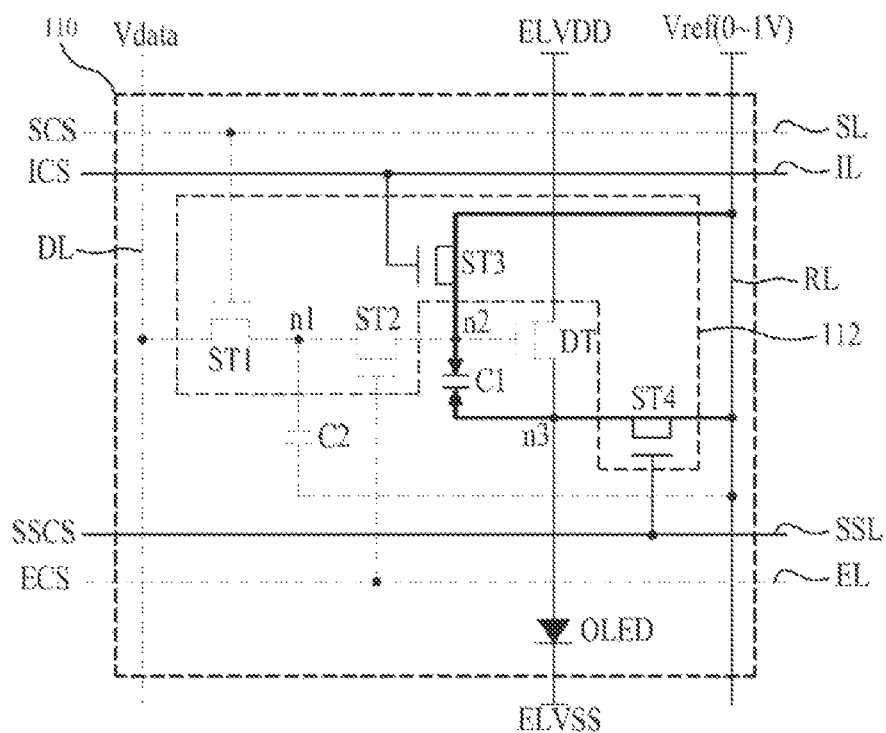
Figure 3B:
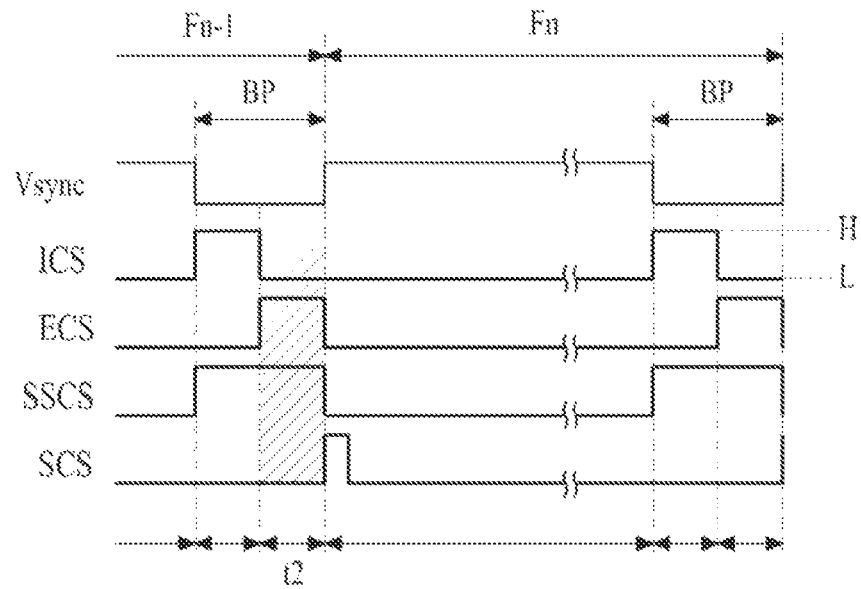
Figure 3B:
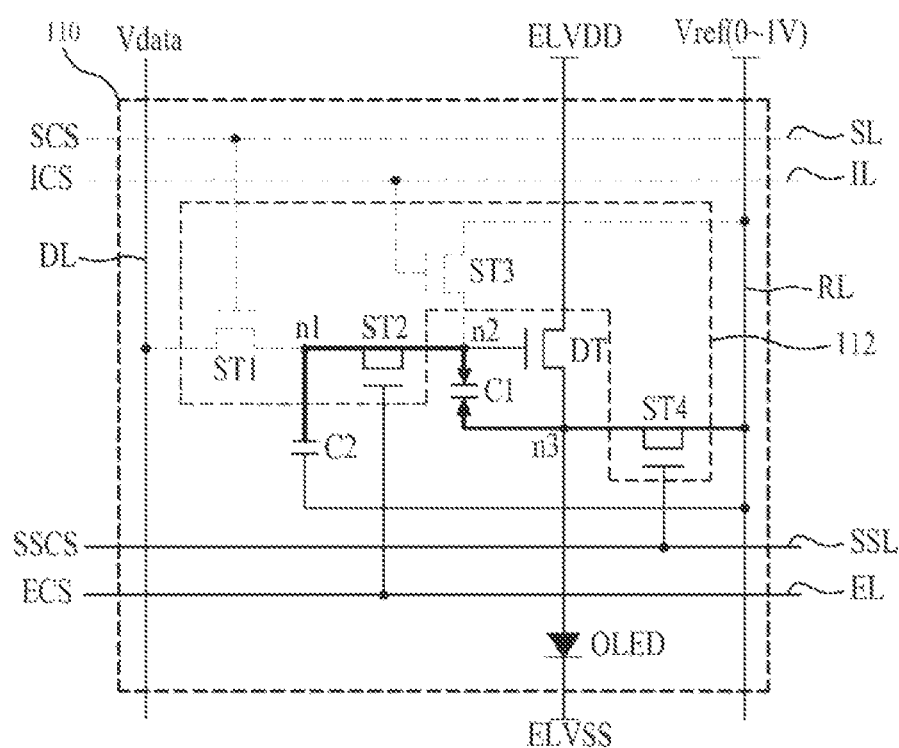
Figure 3C:
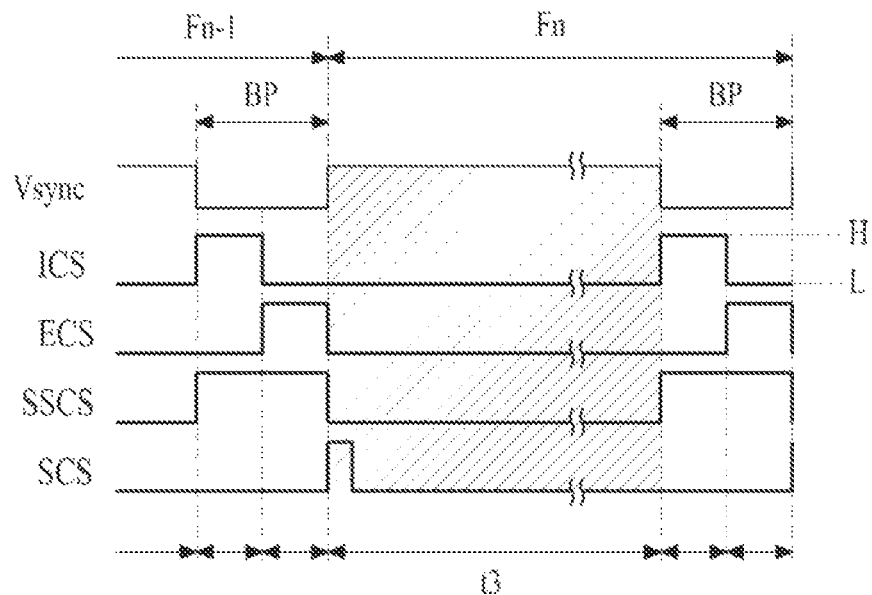
Figure 3C:
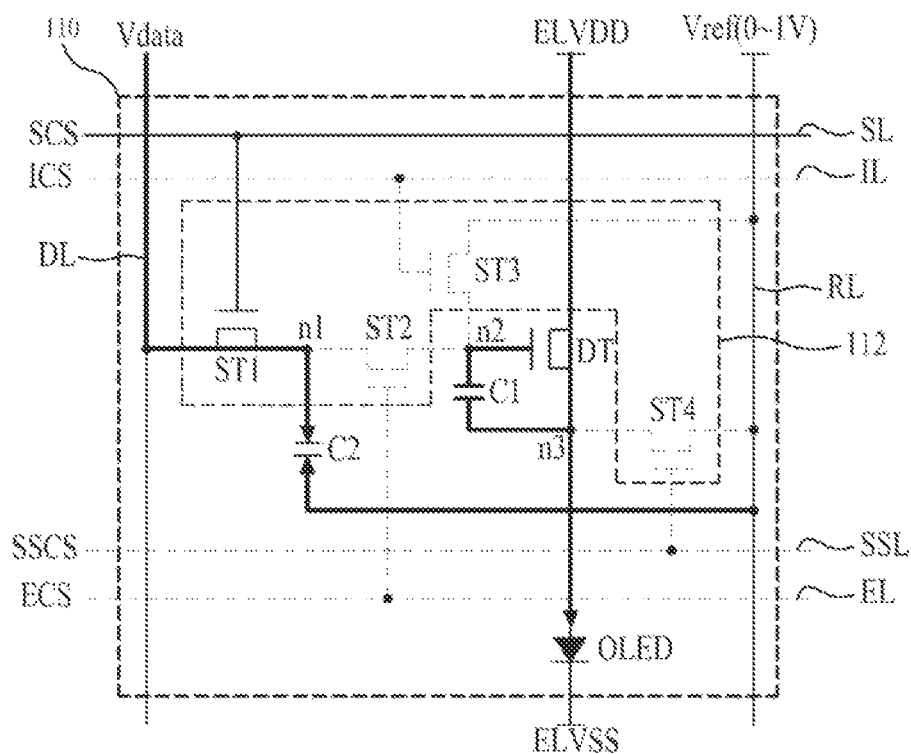

FIGS. 3A to 3C are diagrams illustrating driving of a pixel circuit of a display device 110 according to an embodiment of the present invention.

First of all, referring to FIG. 3A for a first time period t1 set for a blank period BP of a vertical synchronization signal Vsync, a reset control signal ICS of high voltage H, a light emitting control signal ECS of low voltage L, a sensing control signal SSCS of high voltage H, and a scan control signal SCS of low voltage L are respectively supplied to the pixel circuit 110, whereby the switching unit 112 resets the first capacitor C1 in response to the control signals ICS, SSCS, ECS and SCS.

In more detail, for the first time period t1, the first switching transistor ST1 maintains turned-off state through the scan control signal SCS of low voltage L, and the second switching transistor ST2 maintains turned-off state through the light emitting control signal ECS of low voltage L. On the other hand, for the first time period t1, the third switching transistor ST3 is turned on by the reset control signal ICS of high voltage H and at the same time the fourth switching transistor ST4 is turned on by the sensing control signal SSCS of high voltage H. As a result, the reference voltage Vref supplied to the reference line RL is supplied to the second node n2 through the turned-on third switching transistor ST3 and at the same time is supplied to the third node n3 through the turned-on fourth switching transistor ST4, whereby the reference voltage Vref is supplied to each of the first and second electrodes of the first capacitor C1, and thus the first capacitor C1 is reset to the reference voltage Vref. Since a voltage of 0 to 1V is applied to the anode voltage of the organic light emitting device OLED by the reference voltage Vref supplied to the third node n3 through the turned-on fourth switching transistor ST4 for the first time period t1, the organic light emitting device OLED does not emit light for the first time period t1.

Then, as shown in FIG. 3B, for a second time period t2 set for the blank period BP of the vertical synchronization signal Vsync, a reset control signal ICS of low voltage L, a light emitting control signal ECS of high voltage H, a sensing control signal SSCS of high voltage H, and a scan control signal SCS of low voltage L are respectively supplied to the pixel circuit 110, whereby the switching unit 112 charges the voltage Vdata-Vref of a current frame Fn, which is previously stored in the second capacitor C2, in the first capacitor C1 in response to the control signals ICS, SSCS, ECS and SCS.

In more detail, for the second time period t2, the first switching transistor ST1 maintains turned-off state through the scan control signal SCS of low voltage L, and the third switching transistor ST3 is turned off by the reset control signal ICS of low voltage L. On the other hand, for the second time period t2, the second switching transistor ST2 is turned on by the light emitting control signal ECS of high voltage H, and the fourth switching transistor ST4 maintains turned-on state through the sensing control signal SSCS of high voltage H. As a result, the voltage stored in the second capacitor C2 is supplied to the second node n2 through the turned-on second switching transistor ST2 and at the same time the reference voltage V ref supplied to the reference line RL is supplied to the third node n3 through the turned-on fourth switching transistor ST4, whereby the voltage stored in the second capacitor C2 is charged in the first capacitor C1. The organic light emitting device OLED does not emit light by means of the reference voltage Vref supplied to the third node n3 through the turned-on fourth switching transistor ST4 for the second time period t2.

Next, as shown in FIG. 3C, for a third time period t3 set for a vertical valid period of the vertical synchronization signal Vsync, a reset control signal ICS of low voltage L, a light emitting control signal ECS of low voltage L, a sensing control signal SSCS of low voltage L, a scan control signal SCS of low voltage L, and a scan control signal SCS of high voltage H, which has a pulse width corresponding to an addressing period, are respectively supplied to the pixel circuit 110, whereby the switching unit 112 allows the organic light emitting device OLED to emit light in accordance with the voltage of the first capacitor C1 in response to the control signals ICS, SSCS, ECS and SCS and at the same time charges the data voltage Vdata of next frame in the second capacitor C2 previously.

In more detail, for the third time period t3, the second switching transistor ST2 is turned off by the light emitting control signal ECS of low voltage L and at the same time the fourth switching transistor ST4 is turned off by the sensing control signal SCS of low voltage L, and the third switching transistor ST3 maintains turned-off state through the reset control signal ICS of low voltage L. On the other hand, for the third time period t3, the first switching transistor ST1 is turned on by the scan control signal SCS of high voltage H. As a result, the fourth switching transistor ST4 is turned off for the third time period t3, whereby the driving transistor DT is turned on by the voltage stored in the first capacitor C1, supplies the current corresponding to the voltage of the first capacitor C1 to the organic light emitting device OLED and allows the organic light emitting device OLED to emit light. At the same time, for the third time period t3, as the first switching transistor ST1 is turned on and the second switching transistor ST2 is turned off, the data voltage Vdata of next frame, which is supplied to the data line DL, is supplied to the first node n1 through the turned-on first switching transistor ST1, whereby the difference voltage Vdata–Vref of the data voltage Vdata and the reference voltage Vref of next frame is charged in the second capacitor C2, and the voltage Vdata–Vref charged in the second capacitor C2 is transferred to the first capacitor C1 for the second time period performed for the blank period BP of the current frame Fn.

Meanwhile, according to the present invention, the voltage level of the reference voltage Vref may be set to be lower than the second driving power source ELVSS applied to the cathode electrode of the organic light emitting device OLED, and a reverse bias voltage may be applied to the organic light emitting device OLED for the first and second time periods t1 and t2, whereby degradation of the organic light emitting device OLED may be compensated to extend its lifespan.

Figure 4:
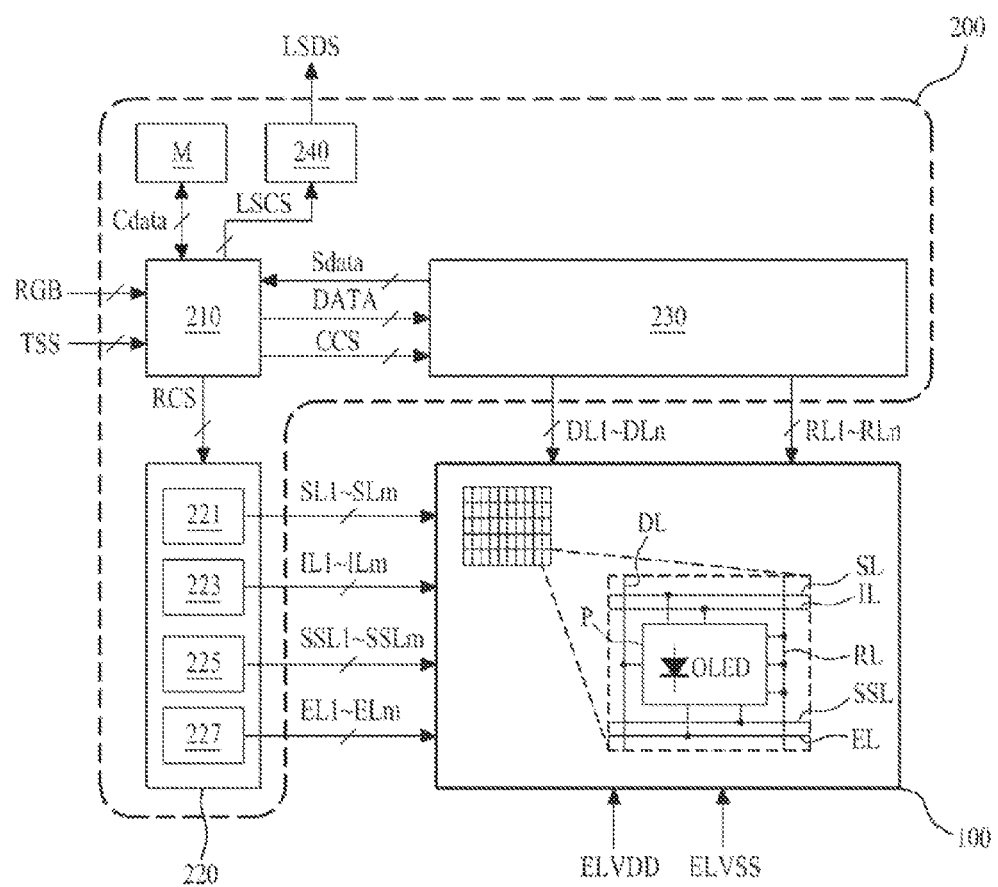
FIG. 4 is a diagram illustrating an organic light emitting display device according to an embodiment of the present invention.

FIG. 4 is a diagram illustrating an organic light emitting display device according to an embodiment of the present invention.

Referring to FIG. 4, the organic light emitting display device according to an embodiment of the present invention includes a display panel 100 and a panel driver 200.

The display panel 100 includes a plurality of data lines DL1 to DLn, a plurality of reference lines RL1 to RLn, a plurality of scan control lines SL1 to SLm, a plurality of light emitting control lines EL1 to ELm, a plurality of reset control lines IL1 to ILm, a plurality of sensing control lines SSL1 to SSLm, and a plurality of pixels P.

The plurality of data lines DL1 to DLn are formed in parallel to have constant intervals along a first direction of the display panel 100, that is, vertical direction.

The plurality of reference lines RL1 to RLn are formed at constant intervals to be parallel with the plurality of data lines DL1 to DLn.

The plurality of scan control lines SL1 to SLm are formed in parallel to have constant intervals along a second direction of the display panel 100, that is, horizontal direction, thereby crossing the plurality of data lines DL1 to DLn.

The plurality of light emitting control lines EL1 to ELm, the plurality of reset control lines IL1 to ILm and the plurality of sensing control lines SSL to SSLm are formed at constant intervals to be parallel with the plurality of scan control lines SL1 to SLm. In this case, one side of each of the plurality of light emitting control lines EL1 to ELm may be connected to a common light emitting control line (not shown) at one side of the display panel 100. In this case, the light emitting control signal ECS output from the panel driver 200 may simultaneously be supplied to each of the plurality of light emitting control lines EL1 to ELm through the common light emitting control line. Also, one side of each of the plurality of reset control lines IL1 to ILm may be connected to a common reset control line (not shown) at one side of the display panel 100. In this case, the reset control signal ICS output from the panel driver 200 may simultaneously be supplied to each of the plurality of reset control lines IL1 to ILm through the common reset control line.

Meanwhile, the display panel 100 is provided with a plurality of first driving power lines (not shown) and at least one second driving power line (not shown). The plurality of first driving power lines are formed in parallel with the plurality of data lines DL1 to DLn, whereby the first driving power source ELVDD is supplied from an external power supply (not shown) to the plurality of first driving power lines. Also, although at least one second driving power line (not shown) may be formed on an entire surface of the display panel 100, a plurality of second driving power lines may be formed to be parallel with the data lines DL1 to DLn or the scan control lines SL1 to SLm. A second driving power source ELVSS lower than the first driving power source ELVDD is supplied from the external power supply to the at least one second driving power line or the plurality of second driving power lines (not shown).

Each of the plurality of pixels P is formed per pixel region defined by each of the plurality of data lines DL1 to DLn and the plurality of scan control lines SL1 to SLm, which cross each other. In this case, each of the plurality of pixels P may be any one of red pixel, green pixel, blue pixel and white pixel. One unit pixel that displays one image may include adjacent red pixels, green pixel, blue pixel and white pixel, or may include red pixel, green pixel and blue pixel. Each of the plurality of pixels P includes the pixel circuit 110 according to the present invention as shown in FIG. 2 and its repeated description will be omitted.

The panel driver 200 drives the display panel 100 in a sensing mode or a three-dimensional image display mode. In this case, the sensing mode may be performed in accordance with setting of a user, or per set period (or time) or per blank period of at least one frame that displays image.

The panel driver 200 generates sensing data Sdata by sensing characteristic variation (for example, threshold voltage and/or mobility) of the driving transistor DT included in each pixel P through each of the plurality of reference lines RL1 to RLn during the sensing mode. Also, the panel driver 200 improves luminance of a three-dimensional image by addressing the data voltage of next frame while allowing the organic light emitting devices OLED of the respective pixels P to simultaneously emit light during the three-dimensional image display mode. Especially, the panel driver 200 avoids or minimizes picture quality deterioration caused by Mura within a screen by correcting the data voltage which will be supplied to the corresponding pixel P on the basis of the sensing data Sdata of each pixel P, wherein the Mura is generated by characteristic variation of the driving transistor DT of each pixel. To this end, the panel driver 200 may include a timing controller 210, a row driver 220, a column driver 230, and a liquid crystal shutter driver 240.

The timing controller 210 generates a row control signal RCS and a column control signal CCS, which are intended to control the row driver 220 and the column driver 230 in a sensing mode or a three-dimensional image display mode on the basis of a timing synchronization signal TSS which is input externally. In this case, during the three-dimensional image display mode, the row control signal RCS may include a first row control signal for supplying the scan control signal to each of the plurality of scan control lines SL1 to SLm, a second row control signal for supplying the light emitting control signal to the plurality of light emitting control lines EL1 to ELm, a third row control signal for supplying the reset control signal to the plurality of reset control lines IL1 to ILm, and a fourth row control signal for supplying the sensing control signal to the plurality of sensing control lines SSL1 to SSLm.

Also, the timing controller 210 generates a liquid crystal shutter control signal LSCS for alternately driving a left-eye liquid crystal shutter (not shown) and a right-eye liquid crystal shutter (not shown) of glasses for three-dimensional image in a unit of frame on the basis of externally input data RGB and the timing synchronization signal TSS, during the three-dimensional image display mode.

The timing controller 210 compensates for characteristic variation of the driving transistor DT included in each pixel P by correcting the input data RGB of each pixel P on the basis of the sensing data Sdata provided from the column driver 230 in accordance with the sensing mode, during the three-dimensional image display mode, thereby preventing or minimizing picture quality deterioration caused by Mura within the screen, which is generated in accordance with characteristic variation of the driving transistor DT of each pixel P. In more detail, during the three-dimensional image display mode, the timing controller 210 calculates compensation data of each pixel P on the basis of the sensing data Sdata of each pixel P, reads previous compensation data Cdata of each pixel P, which are stored in a memory M to correspond to each pixel P, calculates a deviation value by comparing the calculated compensation data Sdata of each pixel P with the previous compensation data Cdata read from the memory M, generates the compensation data Cdata of each pixel P by adding or subtracting the calculated deviation value to or from the previous compensation data Cdata of each pixel, and then updates the compensation data Cdata of each pixel P by storing the compensation data Cdata in the memory M. Next, the timing controller 210 receives the input data RGB of each pixel P, which are input externally, reads the compensation data Cdata of each pixel P, which are stored in the memory M, and generates pixel data DATA of each pixel P by reflecting the compensation data Cdata of each pixel P in the input data RGB of the corresponding pixel P.

Meanwhile, the timing controller 210 may drive the display panel 100 in a two-dimensional image display mode. In this case, the two-dimensional image display mode is driven equally to the three-dimensional image display mode except that the input data RGB which will be displayed in each pixel P are two-dimensional image data.

The row driver 220 generates the control signals SCS, ICS, SSCL and ECS based on the sensing mode or the three-dimensional image display mode in response to the row control signal RCS supplied from the timing controller 210 and supplies the generated control signals to the control lines SL, IL, EL and SSL formed in the display panel 110. In this case, the row control signal RCS may include a start signal and a plurality of clock signals.

The row driver 220 according to one embodiment may include a scan control line driver 221, a reset control line driver 223, a sensing control line driver 225, and a light emitting control line driver 227.

The scan control line driver 221 is connected to one side of each of the plurality of scan control lines SL1 to SLm. The scan control line driver 221 generates the scan control signal SCS in accordance with the row control signal RCS (or first row control signal) and sequentially supplies the generated scan control signal to the plurality of scan control lines SL1 to SLm in due order. Especially, the scan control line driver 221 sequentially supplies the scan control signal SCS to the plurality of scan control lines SL1 to SLm in due order for the third time period for which the organic light emitting device OLED of each pixel P emits light during the three-dimensional image display mode, whereby the data voltage of next frame may be sequentially addressed to each pixel P while the organic light emitting device OLED of each pixel P emits light. Also, the scan control line driver 221 generates the scan control signal SCS in accordance with the row control signal RCS (or first row control signal) during the sensing mode and sequentially supplies the generated scan control signal to the plurality of scan control lines SL1 to SLm in due order, whereby the sensing data voltage may be sequentially addressed to each pixel in due order.

The reset control line driver 223 may be connected to one side of each of the plurality of reset control lines IL1 to ILm, or may be connected to one side of each of the plurality of reset control lines IL1 to ILm through the common reset control line formed at one side of the display panel 100. The reset control line driver 223 generates the reset control signal ICS of high voltage in accordance with the row control signal RCS (or second row control signal) for the first time period during the three-dimensional image display mode and simultaneously supplies the generated reset control signal ICS to the plurality of reset control lines IL1 to ILm, whereby the first capacitors C1 of the respective pixels P may be reset at the same time. Also, the reset control line driver 223 generates the reset control signal ICS of low voltage in accordance with the row control signal RCS (or second row control signal) during the sensing mode and simultaneously supplies the generated reset control signal ICS to the plurality of reset control lines IL1 to ILm, whereby the turned-off state of the third switching transistor ST3 of each pixel P may be maintained.

The sensing control line driver 225 is connected to one side of each of the plurality of sensing control lines SSL1 to SSLm. The sensing control line driver 225 generates the sensing control signal SSCS in accordance with the row control signal RCS (or third row control signal) for the first and second time periods during the three-dimensional image display mode and simultaneously supplies the generated sensing control signal SSCS to the plurality of sensing control lines SSL1 to SSLm, whereby the first capacitors C1 of the respective pixels P may be reset at the same time and the voltage of the second capacitor C2 of each pixel P may be charged in the first capacitor C1 for the second time period. Also, the sensing control line driver 225 generates the sensing control signal SSCS in accordance with the row control signal RCS (or third row control signal) during the sensing mode and simultaneously supplies the generated sensing control signal SSCS to the plurality of sensing control lines SSL1 to SSLm, whereby characteristic variation of the driving transistor DT included in each pixel P may be sensed.

The light emitting control line driver 227 may be connected to one side of each of the plurality of light emitting control lines EL1 to ELm, or may be connected to one side of each of the plurality of light emitting control lines EL1 to ELm through the common light emitting control line formed at one side of the display panel 100. The light emitting control line driver 227 generates the light emitting control signal ECS in accordance with the row control signal RCS (or fourth row control signal) for the second time period during the three-dimensional image display mode and simultaneously supplies the generated light emitting control signal ECS to the plurality of light emitting control lines EL1 to Elm, whereby the voltage of the second capacitor C2 of each pixel P may be charged in the first capacitor C1 for the second time period. Also, the light emitting control line driver 227 generates the light emitting control signal ECS in accordance with the row control signal RCS (or fourth row control signal) during the sensing mode and simultaneously supplies the generated light emitting control signal ECS to the plurality of light emitting control lines EL1 to ELm, whereby the sensing data voltage addressed in accordance with the scan control signal SCS may be applied to the gate electrode of the driving transistor DT.

The aforementioned row driver 220 may directly be formed on the display panel 100 together with a process of forming a thin film transistor of each sub pixel P, or may be formed in the form of an integrated circuit IC, whereby the row driver 220 may be connected to one side of the control lines SL, EL, IL and SSL.

The column driver 230 is connected to the plurality of data lines DL1 to DLn and the plurality of reference lines RL1 to RLn, and is driven in the sensing mode and the three-dimensional image display mode under the control of the timing controller 210.

In case of the sensing mode, the column driver 230 generates the sensing data Sdata by sensing characteristic variation of the driving transistor DT included in each pixel P in response to the column control signal CCS of the sensing mode, which is supplied from the timing controller 210, and provides the generated sensing data Sdata to the timing controller 210. Also, in case of the three-dimensional image display mode, the column driver 230 converts pixel data DATA supplied from the timing controller 210 in a unit of horizontal line by using a plurality of reference gamma voltages RGV supplied from a reference gamma voltage supply (not shown), to the data voltage in accordance with the column control signal CCS of the three-dimensional image display mode, which is supplied from the timing controller 210 and supplies the converted voltage to the corresponding data lines DL1 to DLn, and supplies the reference voltage Vref to each of the plurality of reference lines RL1 to RLn.

Figure 5:
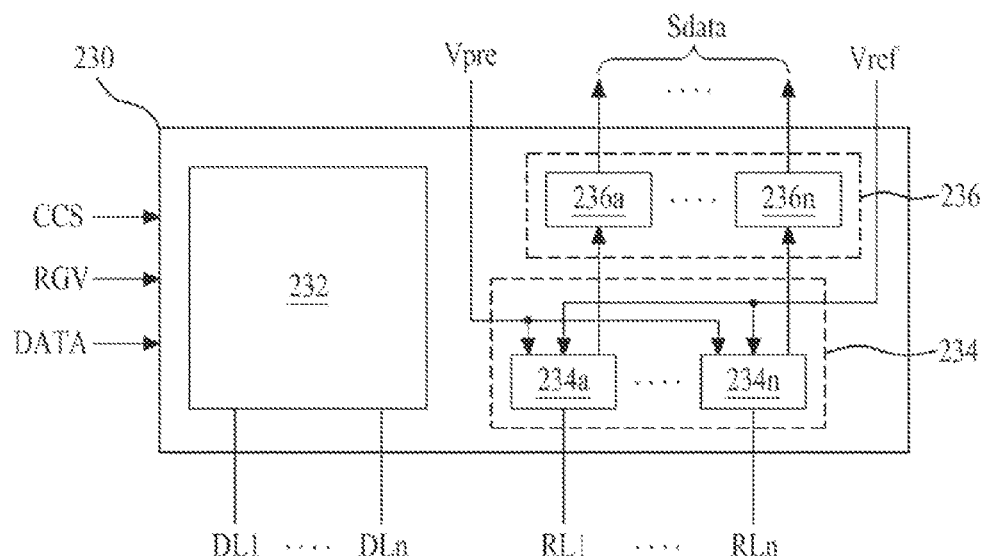
FIG. 5 is a block diagram illustrating a column driver shown in FIG. 2.

The column driver 230 according to one embodiment includes a data driver 232, a switching unit 234 and a sensing unit 236 as shown in FIG. 5.

The data driver 232 converts pixel data (or sensing pixel data) DATA supplied from the timing controller 210 to the data voltage Vdata in response to the column control signal CCS supplied from the timing controller 210 in accordance with the three-dimensional image display mode or the sensing mode, and supplies the converted voltage to the corresponding data lines DL1 to DLn. Especially, for the third time period of the three-dimensional image display mode, the data driver 232 samples the data DATA of each pixel P, which are input in a unit of one horizontal line, in accordance with the column control signal DCS, selects a gamma voltage corresponding to a grayscale value of the sampled data among the plurality of reference gamma voltages RGV supplied from the reference gamma voltage supply (not shown) as the data voltage, and supplies the selected voltage to the corresponding data line DL of each pixel P.

The switching unit 234 supplies the reference voltage Vref, which is externally supplied, to each of the plurality of reference lines RL1 to RLn in response to the column control signal CCS supplied from the timing controller 210. Also, the switching unit 234 supplies a precharging voltage Vpre, which is externally supplied, to each of the plurality of reference lines RL1 to RLn in response to the column control signal CCS supplied from the timing controller 210 during the sensing mode, resets each of the plurality of reference lines RL1 to RLn to the precharging voltage Vpre, and then connects each of the plurality of reference lines RL1 to RLn to the sensing unit 236. To this end, the switching unit 234 according to one embodiment may include a plurality of selectors 234a to 234n connected to each of the plurality of reference lines RL1 to RLn and the sensing unit 236, wherein the selectors 234a to 234n may be comprised of multiplexers.

In case of the sensing mode, the sensing unit 236 is connected to the plurality of reference lines RL1 to RLn through the switching unit 234 and senses the voltage of each of the plurality of reference lines RL1 to RLn, and generates the sensing data Sdata corresponding to the sensing voltage and provides the generated data to the timing controller 210. To this end, the sensing unit 236 may include a plurality of analog-to-digital converters 236a to 236n which are connected to the plurality of reference lines RL1 to RLn through the switching unit 234, convert the sensing voltage to an analog-to-digital voltage, and generate the sensing data Sdata.

Referring to FIG. 4 again, the liquid crystal shutter driver 240 generates a liquid crystal shutter driving signal LSDS for alternately driving the left-eye liquid crystal shutter or the right-eye liquid crystal shutter in a unit of frame in response to the liquid crystal shutter control signal LSCS supplied from the timing controller 210, and transmits the generated liquid crystal shutter driving signal LSDS to three-dimensional image glasses (not shown) in accordance with a short-distance wireless communication mode. As a result, the three-dimensional image glasses receive the liquid crystal shutter driving signal LSDS transmitted from the liquid crystal shutter driver 240 and alternately drives the left-eye liquid crystal shutter and the right-eye liquid crystal shutter in a unit of frame in accordance with the received liquid crystal shutter driving signal LSDS, whereby the left-eye image displayed in the display panel 100 may transmit the left-eye liquid crystal shutter only and then may be provided to the left eye of the viewer and the right-eye image displayed in the display panel 100 may transmit the right-eye liquid crystal shutter only and then may be provided to the right eye of the viewer.

Figure 6:
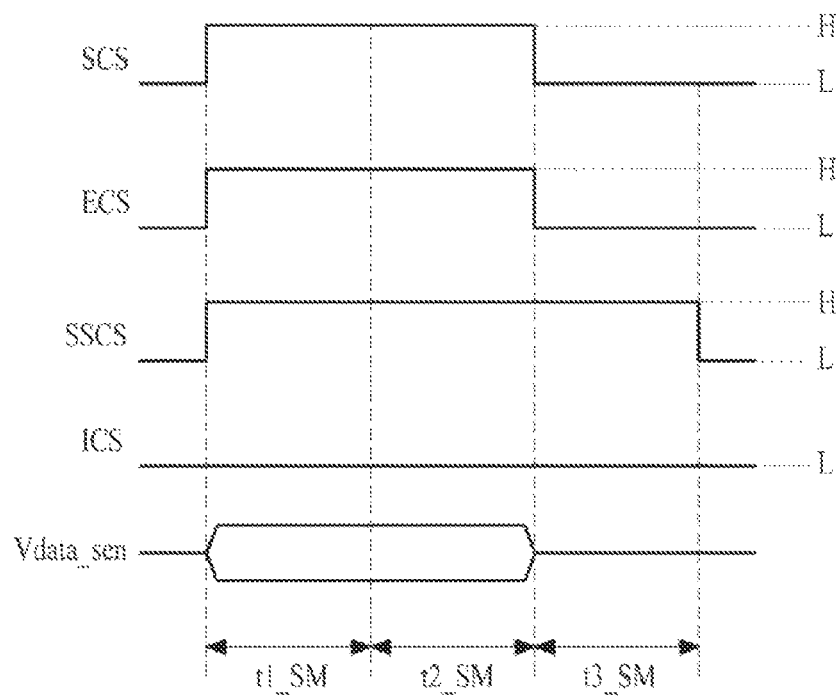
FIG. 6 is a waveform diagram illustrating a driving waveform during a sensing mode of an organic light emitting display device according to an embodiment of the present invention.
Figure 7:
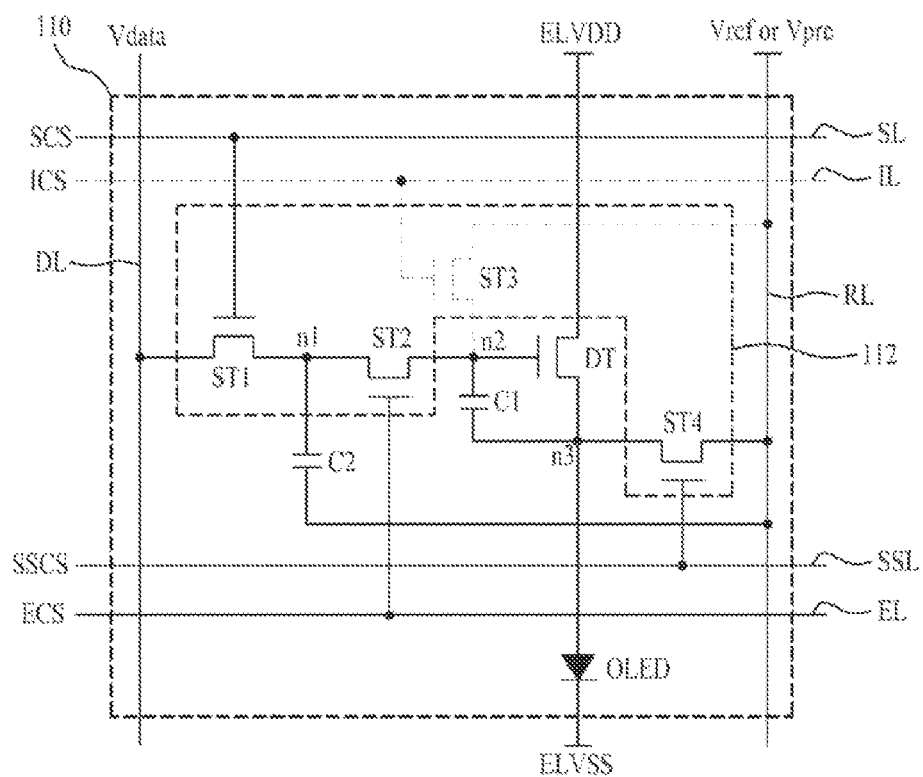
FIG. 7 is a diagram illustrating driving of each pixel during a sensing mode of an organic light emitting display device according to an embodiment of the present invention.

FIG. 6 is a waveform diagram illustrating a driving waveform during a sensing mode of an organic light emitting display device according to an embodiment of the present invention, and FIG. 7 is a diagram illustrating driving of each pixel during a sensing mode of an organic light emitting display device according to an embodiment of the present invention.

Referring to FIGS. 4 to 7, during the sensing mode, the panel driver 200 drives the driving transistor DT included in each pixel P of the display panel 100 in a source follow mode, thereby sensing characteristic variation of the driving transistor DT. To this end, the aforementioned timing controller 210 generates a column control signal CCS and a row control signal RCS, which are intended to drive the pixel P for first to third time periods t1_SM, t2_SM and t3_SM and supplies the generated signals to the row driver 220 and the column driver 230, and at the same time generates sensing pixel data DATA which is a bias voltage supplied to the gate electrode of the driving transistor DT and supplies the generated sensing pixel data DATA to the column driver 230.

For the first time period t1_SM, the first switching transistor ST1 is turned on by the scan control signal SCS of high voltage H, the second switching transistor ST2 is turned on by the light emitting control signal ECS of high voltage H, the fourth switching transistor ST4 is turned on by the sensing control signal SSCS of high voltage H, and the third switching transistor ST3 is turned off by the reset control signal ICS of low voltage L. As a result, the sensing data voltage Vdata_sen supplied to the data line DL is supplied to the second node n2, that is, the gate electrode of the driving transistor DT through the turned-on first and second switching transistors ST1 and ST2 and at the same time the precharging voltage Vpre supplied to the reference line RL is supplied to the third node n3, that is, the source electrode of the driving transistor DT through the turned-on fourth switching transistor ST4. At this time, the sensing data voltage Vdata_sen has a level of a target voltage set to sense a threshold voltage of the driving transistor DT. As a result, the source electrode of the driving transistor DT and the reference line RL are reset to the precharging voltage Vpre for the first time period t1_SM.

Then, for the second time period t2_SM, the turn-off state of the third switching transistor ST3 is maintained, the turned-on state of the first, second and fourth switching transistors ST1, ST2 and ST4 is maintained, and the reference line RL is converted to a floating state by switching of the switching unit 234 included in the column driver 230 in a state that the turned-off state of the third switching transistor ST3 is maintained. As a result, the gate voltage of the driving transistor DT is fixed to the voltage level of the sensing data voltage Vdata_sen by the first and second switching transistors ST1 and ST2 maintained at the turned-on state, and the driving transistor DT is driven in a saturation driving mode by the sensing data voltage Vdata_sen which is the bias voltage supplied to the gate electrode, whereby a difference voltage Vdata-Vth of the sensing data voltage Vdata_sen and the threshold voltage Vth of the driving transistor DT is charged in the reference line RL of the floating state.

Afterwards, for the third time period t3_SM, the turned-off state of the third switching transistor ST3 is maintained by the reset control signal ICS of low voltage L, the first switching transistor ST1 is turned off by the scan control signal SCS of low voltage L, and the second switching transistor ST2 is turned off by the light emitting control signal ECS of low voltage L, whereas the fourth switching transistor ST4 is turned on by the sensing control signal SSCS of high voltage H. In this state, the reference line RL is connected to the sensing unit 236 by switching of the switching unit 234. Accordingly, the sensing unit 236 senses the voltage of the reference line RL, generates the sensing data Sdata by converting the sensed voltage, that is, the threshold voltage of the driving transistor DT, to an analog-to-digital voltage, and provides the generated sensing data Sdata to the timing controller 210.

Figure 8:
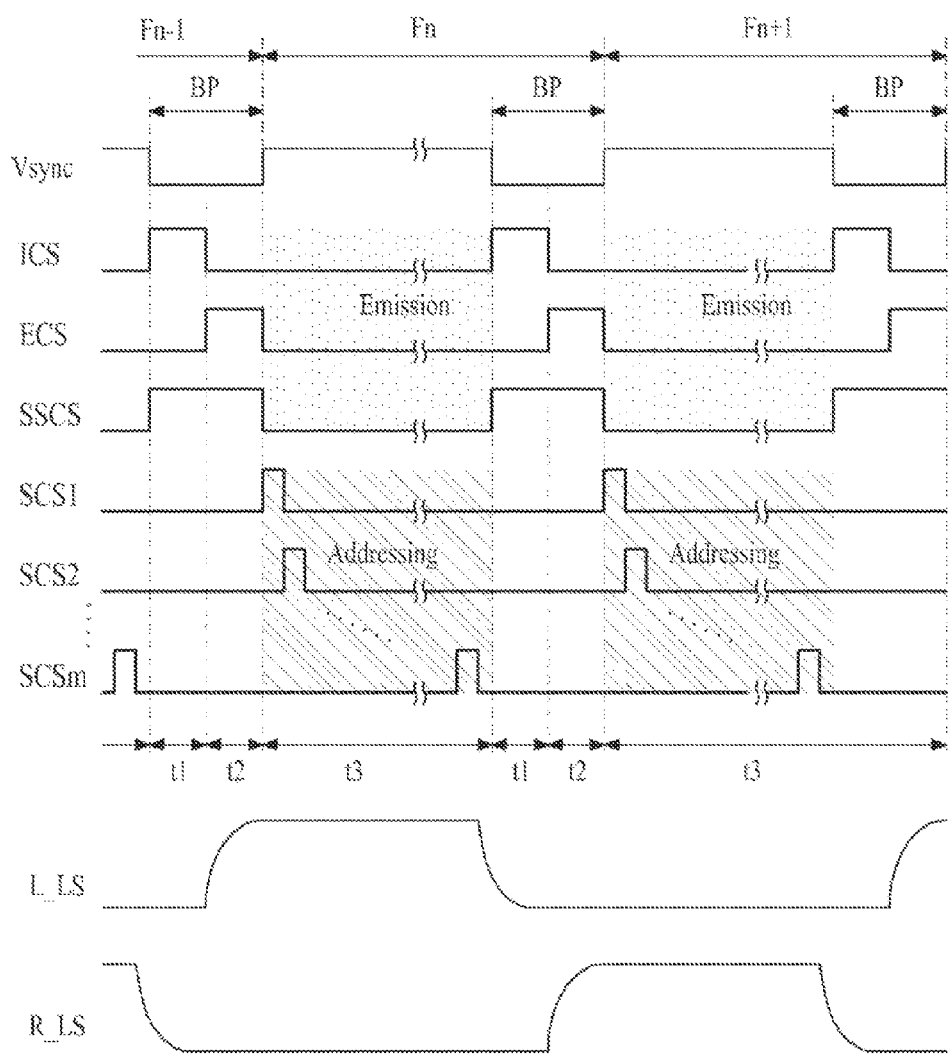
FIG. 8 is a waveform diagram illustrating a method for driving a pixel based on a three-dimensional image display mode of an organic light emitting display device according to an embodiment of the present invention.

FIG. 8 is a waveform diagram illustrating a method for driving a pixel based on a three-dimensional image display mode of an organic light emitting display device according to an embodiment of the present invention.

Referring to FIGS. 4 and 8, during the three-dimensional image display mode, the timing controller 210 generates a column control signal CCS and a row control signal RCS, which are intended to drive each pixel P for first to third time periods t1, t2 and t3 and supplies the generated signals to the row driver 220 and the column driver 230, and at the same time generates pixel data DATA by correcting input data RGB of each pixel P as described above on the basis of the sensing data Sdata sensed by the sensing mode and supplies the generated pixel data DATA to the column driver 230. Also, the timing controller 210 generates a liquid crystal shutter control signal LSCS corresponding to the input data RGB every third time period t3 and provides the generated liquid crystal shutter control signal LSCS to the liquid crystal shutter driver 240.

First of all, since the method for driving each pixel p for each of the first to third time periods t1, t2 and t3 is the same as the method for driving a pixel circuit 110, which has been described with reference to FIGS. 3A to 3C, its detailed description will be omitted.

At the first time period t1 of N frame Fn, the first capacitor C1 of every pixel P formed in the display panel 110 is reset to the reference voltage Vref in accordance with switching of the switching unit 112 included in each pixel P based on each of the scan control signal SCS of low voltage L, the light emitting control signal ECS of low voltage L, the reset control signal ICS of high voltage H and the sensing control signal SSCS of high voltage H.

Then, at the second time period t2 of N frame Fn, a left-eye data voltage of the N frame Fn, which is stored in the second capacitor C2 of each pixel P formed in the display panel 110, is charged in the first capacitor C1 in accordance with switching of the switching unit 112 included in each pixel P based on each of the scan control signal SCS of low voltage L, the light emitting control signal ECS of high voltage H, the reset control signal ICS of low voltage L and the sensing control signal SSCS of high voltage H.

Then, at the third time period t3 of N frame Fn, the organic light emitting devices OLED simultaneously emit light by means of the left-eye data voltage charged in the first capacitor C1 of each pixel P in accordance with switching of the switching unit 112 included in each pixel P based on each of the light emitting control signal ECS of low voltage L, the reset control signal ICS of low voltage L, the sensing control signal SSCS of low voltage L, and the scan control signals SCS of high voltage H which are shifted sequentially, and at the same time a right-eye data voltage of N+1 frame Fn+1 is addressed to each pixel P. Simultaneously, at the third time period t3, the lefty-eye liquid crystal shutter L_LS for three-dimensional image glasses corresponding to the left-eye data voltage charged in the first capacitor is opened while the right-eye liquid crystal shutter R_LS is closed in accordance with the liquid crystal shutter driving signal LSDS generated by the liquid crystal shutter driver 240. As a result, the viewer views the left-eye image displayed in the display panel 100 by simultaneous light-emission of the organic light emitting devices OLED of the respective pixels P for the third time period t3 of the N frame Fn, through the left-eye liquid crystal shutter L_LS of the three-dimensional image glasses.

One pixel P for the third time period t3 of the N frame Fn will be described exemplarily. As the second to fourth switching transistors ST2, ST3 and ST4 are turned off, the driving transistor DT is turned on by the left-eye data voltage charged in the first capacitor C1, whereby the current flows in the driving transistor DT, and the voltage of the third node n3 is increased as the organic light emitting device OLED starts to emit light in proportion to the current, and the voltage of the second node n2 is increased as much as voltage increase of the third node n3 by the first capacitor C1. As a result, the gate-source voltages Vgs of the driving transistor DT are sustained by the voltage of the first capacitor C1, whereby the organic light emitting device OLED continues to emit light to reach the first time period t1 of the N+1 frame Fn+1. In this case, the current flowing in the organic light emitting device OLED is not affected by the threshold voltage of the driving transistor DT due to the compensation data included in the data voltage Vdata as described above.

At the third time period t3 of the N frame Fn, while the organic light emitting devices OLEDs of the respective pixels P emit light at the same time, the first switching transistor ST1 is turned on in accordance with the scan control signal SCS sequentially supplied to the plurality of scan control lines SL1 to SLn, whereby the right-eye data voltage of the N+1 frame Fn+1, which is supplied from the data driver 232 of the column driver 230 to each of the plurality of data lines DL1 to DLn in a unit of one horizontal line, is previously stored in the second capacitor C2 of each pixel P.

Meanwhile, at the N+1 frame Fn+1, the first capacitor C1 of every pixel P is reset to the reference voltage Vref for the first time period t1, the right-eye data voltage of the N+1 frame Fn+1, which is stored in the second capacitor C2 of each pixel, is charged in the first capacitor C1 for the second time period t2, and the organic light emitting devices OLED emit light at the same time in accordance with the right-eye data voltage of the N+1 frame Fn+1, which is charged in the first capacitor C1 of each pixel P, for the third time period t3, and at the same time data voltage of N+2 frame Fn+1 is previously addressed to each pixel P. Simultaneously, at the third time period t3 of the N+1 frame Fn+1, the right-eye liquid crystal shutter R_LS for three-dimensional image glasses, which corresponds to the right-eye data voltage charged in the first capacitor C1, is opened while the left-eye liquid crystal shutter L_LS is closed in accordance with the liquid crystal shutter driving signal LSDS generated by the liquid crystal shutter driver 240. As a result, the viewer views the right-eye image displayed in the display panel 100 by simultaneous light-emission of the organic light emitting devices OLED of the respective pixels P for the third time period t3 of the N+1 frame Fn+1, through the right-eye liquid crystal shutter R_LS of the three-dimensional image glasses.

On the other hand, the pixel of the organic light emitting display device according to an embodiment of the present invention may be driven in accordance with a two-dimensional image display mode. In this case, the pixel may be driven in accordance with the two-dimensional image display mode equally to the three-dimensional image display mode except that the input data RGB which will be displayed in each pixel P are two-dimensional image data, whereby the two-dimensional image may be displayed through simultaneous light-emission of the respective pixels P.

Figure 9:
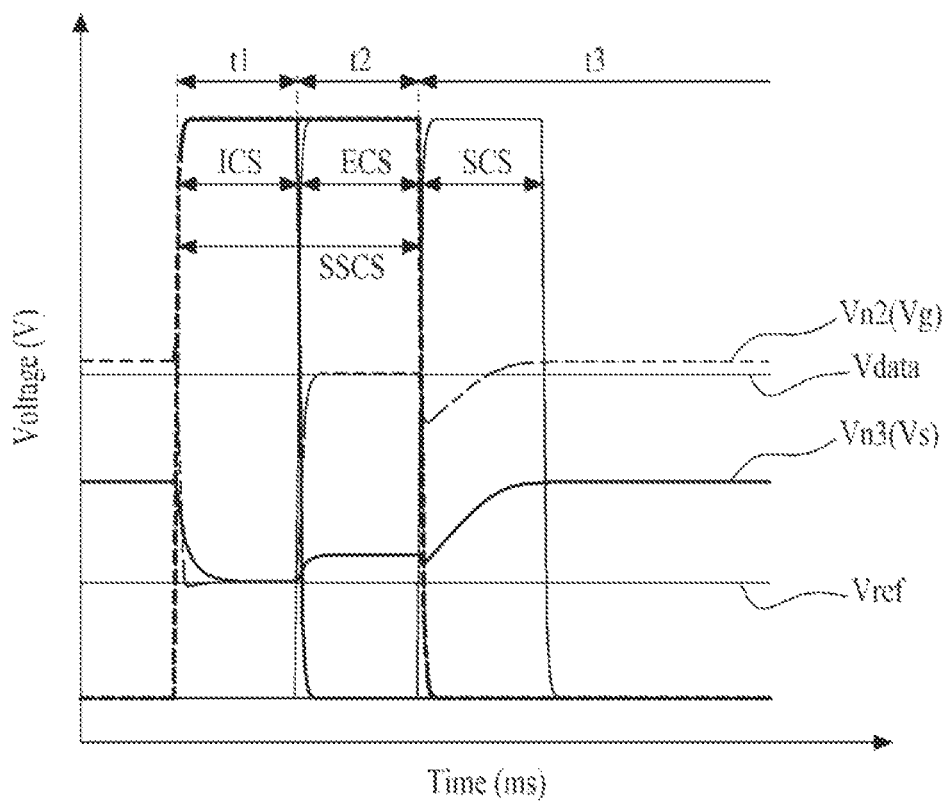
FIG. 9 is a waveform diagram illustrating a driving simulation result of one pixel in an organic light emitting display device according to an embodiment of the present invention.

FIG. 9 is a waveform diagram illustrating a driving simulation result of one pixel in an organic light emitting display device according to an embodiment of the present invention.

As will be aware of it from FIG. 9, it is noted that each of a voltage Vn2 of the second node n2 and a voltage Vn3 of the third node n3, which are the gate-source voltages of the driving transistor of the pixel P, is maintained uniformly even after a data voltage of next frame is addressed to the second capacitor C2 for the third time period t3. Accordingly, in the present invention, even though the data voltage of next frame is sequentially addressed to the respective pixels P in due order while the organic light emitting devices OLED of the respective pixels simultaneously emit light, it does not affect image display of the current frame.

As described above, the pixel circuit and the organic light emitting display device that includes the pixel circuit according to one or more embodiments of the present invention may prevent crosstalk of the left-eye image and the right-eye image from occurring during the three-dimensional image display by allowing the organic light emitting devices OLED of the respective pixels P to simultaneously emit light, whereby picture quality may be prevented from being deteriorated. Also, since black image for avoiding crosstalk of the left-eye image and the right-eye image is not required, luminance of the stereoscopic image may be increased.

Also, since the pixel circuit and the organic light emitting display device that includes the pixel circuit according to one or more embodiments of the present invention may simultaneously turn off the organic light emitting devices OLED of the respective pixels P through the first and second time periods t1 and t2 set to the blank period BP of the vertical synchronization signal Vsync, it may have an effect that black image is inserted per blank period BP of the vertical synchronization signal Vsync, whereby picture quality deterioration caused by motion blurring based on motion picture response time (MPRT) may be prevented from occurring.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A pixel circuit of a display device, the pixel circuit comprising:
 an organic light emitting device configured to emit light through a current;
 a driving transistor configured to control the current flowing in the organic light emitting device;
 a first capacitor including a first electrode connected to a gate electrode and a second electrode directly connected to a source electrode of the driving transistor, respectively, wherein the first electrode is directly connected to a third switching transistor directly connected to a reference voltage line, and the second electrode is connected to a fourth switching transistor that is connected to the reference voltage line;
 a second capacitor in which a data voltage is previously stored, the second capacitor being directly connected to the reference voltage line, and further connected to a node between a first switching transistor and a second switching transistor; and a switching unit configured to charge the data voltage, which is stored in the second capacitor, in the first capacitor, and allow the organic light emitting device to emit light by driving the driving transistor in accordance with the data voltage charged in the first capacitor and at the same time charging a data voltage of next frame in the second capacitor.

2. The pixel circuit of the display device of claim 1, wherein:

wherein the switching unit includes:

the first switching transistor turned on for a third time period, for charging the data voltage of next frame in the second capacitor;

the second switching transistor turned on for a second time period, for charging the data voltage stored in the second capacitor in the first capacitor;

the third switching transistor turned on for a first time period, for supplying a reference voltage to the gate electrode of the driving transistor; and the fourth switching transistor turned on for the first and second time periods, for supplying the reference voltage to the source electrode of the driving transistor.

3. The pixel circuit of the display device of claim 2, wherein:

the first capacitor is reset to the reference voltage supplied by the third and fourth switching transistors turned on for the first time period, and the driving transistor is turned on by the data voltage charged in the first capacitor for the third time period and allows the organic light emitting device to emit light.

4. A pixel circuit of a display device, the pixel circuit comprising:

an organic light emitting device configured to emit light through a current;

a driving transistor configured to control the current flowing in the organic light emitting device;

a first capacitor connected between gate and source electrodes of the driving transistor, and including first and second electrodes, wherein the first and second electrodes of the first capacitor are connected to a reference voltage line via third and fourth switching transistors respectively;

a second capacitor in which a data voltage is previously stored; and a switching unit configured to charge the data voltage, which is stored in the second capacitor, in the first capacitor, and allow the organic light emitting device to emit light by driving the driving transistor in accordance with the data voltage charged in the first capacitor and at the same time charging a data voltage of next frame in the second capacitor;

wherein the switching unit includes:

a first switching transistor turned on for a third time period, for charging the data voltage of next frame in the second capacitor;

a second switching transistor turned on for a second time period, for charging the data voltage stored in the second capacitor in the first capacitor;

the third switching transistor turned on for a first time period, for supplying a reference voltage to the gate electrode of the driving transistor; and the fourth switching transistor turned on for the first and second time periods, for supplying the reference voltage to the source electrode of the driving transistor.

5. The pixel circuit of the display device of claim 4, wherein:

the first capacitor is reset to the reference voltage supplied by the third and fourth switching transistors turned on for the first time period; and the driving transistor is turned on by the data voltage charged in the first capacitor for the third time period and allows the organic light emitting device to emit light.

6. An organic light emitting display device comprising:

a display panel including a plurality of pixels having an organic light emitting device emitting light through a current, a driving transistor controlling the current flowing in the organic light emitting device, a first capacitor connected between gate and source electrodes of the driving transistor and including first and second electrodes, a second capacitor in which a data voltage is previously stored, and a switching unit controlling voltages charged in the first and second capacitors, wherein the second capacitor is directly connected to the reference voltage line, and is further connected to a node between a first switching transistor and a second switching transistor, wherein the first capacitor including a first electrode connected to a gate electrode and a second electrode directly connected to a source electrode of the driving transistor, respectively, and wherein the first electrode is directly connected to a third switching transistor directly connected to a reference voltage line, and the second electrode is connected to a fourth switching transistor connected to the reference voltage line; and a panel driver driving each of the plurality of pixels for first to third time periods by controlling the switching unit of each pixel, wherein the switching unit resets the first capacitor of each pixel for the first time period, charges the data voltage stored in the second capacitor of each pixel in the first capacitor for the second time period, allows the organic light emitting devices of the respective pixels to simultaneously emit light and at the same time sequentially charges a data voltage of next frame in the second capacitors of the respective pixels in due order by driving the driving transistor in accordance with the data voltage charged in the first capacitor of each pixel for the third time period.

7. The organic light emitting display device of claim 6, wherein the first and second time periods are set within a blank period of a vertical synchronization signal which is a reference signal for displaying image in a unit of frame, and the third time period is set to a vertical active period of a vertical synchronization signal or a valid data period of a data enable signal.

8. The organic light emitting display device of claim 6, wherein the switching unit includes:

the first switching transistor turned on for the third time period, for charging the data voltage of next frame in the second capacitor;

the second switching transistor turned on for the second time period, for charging the data voltage stored in the second capacitor in the first capacitor;

the third switching transistor turned on for the first time period, for supplying a reference voltage to the gate electrode of the driving transistor; and the fourth switching transistor turned on for the first and second time periods, for supplying the reference voltage to the source electrode of the driving transistor.

9. The organic light emitting display device of claim 8, wherein:

the display panel further includes a plurality of reference lines for applying the reference voltage to each of the third and fourth switching transistors of each pixel; and the panel driver generates sensing data by sensing characteristic variation of the driving transistor included in each pixel through each of the plurality of reference lines, generates the data voltage of next frame by correcting input data of each pixel on the basis of the sensing data, and supplies the generated data voltage of next frame to each pixel for the third time period.

10. The organic light emitting display device of claim 6, wherein the panel driver generates a liquid crystal shutter control signal for alternately driving a left-eye liquid crystal shutter and a right-eye liquid crystal shutter of three-dimensional image glasses in a unit of frame every third time period.

11. A method for driving an organic light emitting display device comprising a plurality of pixels including an organic light emitting device emitting light through a current, a driving transistor controlling the current flowing in the organic light emitting device, a first capacitor connected between gate and source electrodes of the driving transistor and including first and second electrodes, and a second capacitor connected to a node between a first switching transistor and a second switching transistor and further directly connected to a reference voltage line, the method comprising:

resetting the first capacitor of each pixel for a first time period, wherein the first electrode of the first capacitor is directly connected to a third switching transistor directly connected to the reference voltage line, and the second electrode of the first capacitor is directly connected to a fourth switching transistor connected to the reference voltage line;

charging a data voltage of a current frame, which is previously stored in the second capacitor of each pixel, in the first capacitor for a second time period; and allowing the organic light emitting devices of the respective pixels to simultaneously emit light at the same time and at the same time sequentially charging a data voltage of next frame in the second capacitors of the respective pixels in due order by driving the driving transistor in accordance with the data voltage of the current frame, which is charged in the first capacitor of each pixel, for the third time period.

12. The method of claim 11, wherein the first and second time periods are set within a blank period of a vertical synchronization signal which is a reference signal for displaying image in a unit of frame, and the third time period is set to a vertical active period of a vertical synchronization signal or a valid data period of a data enable signal.

13. The method of claim 11, further comprising:

generating sensing data by sensing characteristic variation of the driving transistor included in each pixel through each of a plurality of reference lines connected to each pixel; and generating the data voltage of next frame by correcting input data of each pixel on the basis of the sensing data, wherein the data voltage of next frame is sequentially stored in the second capacitor of each pixel for the third time period.

14. The method of claim 11, further comprising generating a liquid crystal shutter control signal for alternately driving a left-eye liquid crystal shutter and a right-eye liquid crystal shutter of three-dimensional image glasses in a unit of frame every third time period.

* * * * *